United States Patent [19]

Clarke et al.

[11] Patent Number: 5,757,341
[45] Date of Patent: May 26, 1998

[54] COLOUR LIQUID CRYSTAL PROJECTION DISPLAY SYSTEMS

[75] Inventors: John A. Clarke, Carshalton, England; Allan Carmichael; Martinus V.C. Stroomer, both of Eindhoven, Netherlands

[73] Assignee: U. S. Philips Corporation, New York, N.Y.

[21] Appl. No.: 540,516

[22] Filed: Oct. 10, 1995

[30] Foreign Application Priority Data

Oct. 14, 1994 [GB] United Kingdom ............ 9420750

[51] Int. Cl.⁶ .................................................. G09G 3/36
[52] U.S. Cl. ............................. 345/32; 345/87; 349/57; 349/95
[58] Field of Search .................... 345/84, 87, 32; 349/5, 8, 10, 57, 95, 62, 63, 64, 78; 348/766, 751, 556

[56] References Cited

U.S. PATENT DOCUMENTS

| Re. 35,215 | 4/1996 | Waarts et al. | 359/326 |
|---|---|---|---|
| 5,052,783 | 10/1991 | Hamada | 359/40 |
| 5,161,042 | 11/1992 | Hamada | 349/95 |
| 5,276,538 | 1/1994 | Monji et al. | 359/40 |
| 5,280,371 | 1/1994 | McCartney, Jr. et al. | 359/40 |
| 5,351,151 | 9/1994 | Levy | 359/240 |
| 5,394,255 | 2/1995 | Yokota et al. | 349/62 |
| 5,398,125 | 3/1995 | Willett et al. | 359/40 |
| 5,430,562 | 7/1995 | Fushimi et al. | 359/40 |
| 5,555,476 | 9/1996 | Suszuki et al. | 359/40 |
| 5,583,669 | 12/1996 | Fushimi et al. | 359/5 |

Primary Examiner—Steven Saras
Attorney, Agent, or Firm—Walter M. Egbert, III

[57] ABSTRACT

In a color liquid crystal projection display in which three differently-colored illuminating beams (R,G,B) are incident from mutually different directions on an LC panel (20) having an array of display elements (40) with a microlens array (21) at the input side of the panel end of whose elements (42) overlies a respective group of three adjacent display elements in row or delta configuration and through each of which light of the three colours (R,G,B) is directed at different angles respectively and converged towards respective ones of the display elements in its associated group, a deflecting element array (25), comprising, for example, microlens element (44) or microprisms (46) formed in a glass substrate of the panel, is positioned close to the plane of the display elements to deflect the directions of light of at least two of the three colours from each microlens element (42) to bring the directions of light of the three colours at the output side of the panel towards a common direction, and preferably substantially parallel to one another. A significant reduction in the amount of spread of light if the output side is thereby achieved, such that, inter alia, a comparatively small aperture projection lens (30) can be used.

20 Claims, 4 Drawing Sheets

FIG. 3B

COLOUR LIQUID CRYSTAL PROJECTION DISPLAY SYSTEMS

BACKGROUND OF THE INVENTION

The present invention relates to a colour liquid crystal projection display system comprising a liquid crystal panel having a planar array of display elements for modulating light to produce a display output, a projection lens for collecting the display output from the panel and projecting the display output onto a screen, illuminating means for directing three differently-coloured light illuminating beams onto the panel such that they are incident on the panel from mutually different directions, in which the panel is provided with an array of microlens elements at its input side via which the three different colours of input light are directed onto respective sets of the display elements in the array, and in which each microlens element of the array is associated with a group of three adjacent display elements and input light of one colour is directed through the microlens element towards one display element of its associated group and input light of the other two colours is directed through the microlens element at different angles respectively towards the other two display elements of the group.

A projection system of this kind is known from EP-A-0465171. In a described embodiment, a white light source, comprising for example a metal halide arc lamp, generates a beam of generally parallel white light which is directed onto a set of three dichroic mirrors whose planes are arranged at mutually different slant angles. These dichroic mirrors produce respectively three differently-coloured, red (R), green (G) and blue (B), beams of light which are directed towards the input side of the liquid crystal panel such that the three beams overlap at the region of the panel and are incident upon the panel from three different directions, for example, with a central beam arriving perpendicularly to the panel and the other two, side, beams being tilted with respect to the central beam. The panel carries a microlens array adjacent its input side on the outer surface of one of the glass substrates of the LC panel so that its distance from the array of display elements is determined by the thickness of that substrate. Each microlens element in the array overlies a group of three immediately adjacent LC display elements in a row of the display element array, or in a delta configuration (spread over two rows), constituting red (R), green (G) and blue (B) display elements, and serves to converge and direct light from each of the three, R, G and B, differently-coloured input light beams through a respective one of those three display elements. The display elements modulate the light passing therethrough in accordance with appropriately applied R, G, B video signals and the modulated light outputs from all the display elements in the array so illuminated are collected by a projection lens for projection onto the display screen.

This system has advantages over other known kinds of colour LC projection systems. In comparison with the kind of system which uses three separate LC panels each operable with a respective colour light, the number of components and complexity of the system is, of course, considerably reduced, although the display element density of the panel has to be three times as great to provide the same display resolution. In comparison with conventional colour LC projection systems using a single LC panel in which colour is obtained by using a red, green and blue colour microfilter array in association with the display element array and an illuminating beam of white light, the light output, and hence brightness, is significantly increased for a given light source as around two thirds of the input light in the conventional system is absorbed or reflected by the colour filters.

However the system described in EP-A-0465171 has the disadvantage that the light emerging from the output side of the LC panel has a much larger spread than the input light. Because of the spreading of the output light from the LC panel and the angles of the three (R, G, B) beams emerging from the panel with respect to each other a projection lens having a comparatively large angular (numerical) aperture is necessary which in addition to being of large size, is expensive and complicated to manufacture. The spreading of the output light leads to a further disadvantage in that the viewing screen should have sufficient light diffusing qualities to make the R, G and B beams overlap in the viewer's eye in order to produce a reasonable quality display.

SUMMARY OF THE INVENTION

It is an object of the present invention to provide an improved projection display system of the above kind.

According to the present invention a projection system of the kind described in the opening paragraph is characterised in that the panel includes an array of optical deflecting elements spaced from the microlens element array close to the plane of the display elements which deflecting elements deflect the directions of light of at least two colours from each microlens element to bring the respective directions of light of the three colours from the associated group of display elements at the ouput side of the panel towards a common direction.

Preferably, the deflecting element array is arranged to deflect the direction of at least two of the three light colours from each microlens element such that the directions of the three light colours at the output side of the panel are substantially parallel to one another.

The invention overcomes, at least to some extent, the aforementioned disadvantages. Considering, for example, an embodiment described in EP-A-0465171 in which each group of display elements comprises three display elements in a row and the panel is illuminated by a central (G) beam directed perpendicular onto the panel and two side (R,B) beams whose directions are tilted by equal amounts to either side of the axis of the central beam, the microlens elements each focus light of the central beam onto the middle display element of its associated group and light of the two side beams onto the two other display elements respectively, the angle of incidence of the two side beams on the microlens array being determined according to the pitch of the display elements and the focal length of the microlens element. The consequential light output from each display element is diverging and the centre lines of the outputs from the two display elements to either side of the middle display element are tilted with respect to the centre line of the light output from the middle display element, thereby resulting in a significant spreading of the output light emerging from the panel.

By virtue of the operation of the array of optical deflecting elements, the angles between the directions of the light outputs of all three display elements in each group are reduced, and preferably close to zero. Considering, for example, the case where a group of display elements associated with a microlens element comprises three display elements in a row, then the directions of the two side beams emerging from the panel are closer to, and preferably substantially parallel with, the direction of the central beam. Like the output beams obtained with the system of EP-A-0465171, they are each still diverging but now the angles between the two side beams and the central beam at the output side of the panel are reduced compared with those in the system of EPA-0465171, and this means that a projection lens of smaller numerical aperture can be employed, with considerable savings in both cost and space. Moreover, because the directions of the output beams are now closer to, and preferably parallel with one another the requirement for the viewing screen to have sufficient diffusing qualities is lessened. In the case of the groups of display elements comprising three in a row, as discussed above, the deflecting elements need only deflect two of the three colours of light, and preferably are arranged to deflect light of the two display elements to either side of the central display element of the group. The common direction then corresponds to the direction of the colour light from the central display element.

In the case where each group of display elements comprises a delta configuration, the directions of all three colours may be deflected towards a common direction which common direction does not correspond to the direction of any one colour of light prior to deflection. This may be particularly desirable when the deflecting element array precedes the display element array to ensure that the different colours of light all pass through their respective display elements at an appropriate angle for optimum contrast.

The array of optical elements may be disposed between the display element array and the output side of the panel. Preferably, however, the array is disposed between the microlens element array and the display element array. This provides a further advantage in that by virtue of bringing the direction of the three colours of light toward a common direction, for example, by deflecting the colours of light associated with the two outer display elements of each group such that that light travels in a direction closer to, or parallel with, the direction of light for the central display element before that light reaches the display elements, a more uniform performance is achieved. The angle of the light travelling through an LC display element plays a part in the transmissive value and it is desirable for the transmissive value characteristics of the display elements in this respect to be similar for all colours. It may also be desirable for all three beams to pass through the display elements at the angle that give optimum contrast. To this end, all three beams could be tilted relative to the panel to achieve the optimum contrast requirement.

The deflection of the at least two different light colours directed via a microlens element takes place at a region where they do not overlap with light colours from adjacent microlens elements and this means that the array of deflecting elements is positioned at a region close to the plane of the display elements, where, because of the focusing action of the microlens elements, light of the three differently coloured illuminating beams become separated. The deflecting element array could be positioned close to the plane of the display elements at a region where the three light colours from a respective microlens element are partially overlapping. The deflecting element array may be positioned next to the inner wall of a glass substrate of the LC panel. Alternatively, the deflecting element array may be incorporated in a glass substrate of the LC panel.

The deflecting element array preferably comprises a second microlens element array arranged such that each microlens element of this second array corresponds to, and is aligned with, a respective microlens element of the first-mentioned microlens element array and covers the group of three display elements associated therewith. By arranging that the focal length of the microlens elements in the second array is substantially equal to the optical distance between the second array and the first-mentioned array, then all colours will emerge from the second microlens element array with much the same range of angles, that is, the directions of the centre lines of the three colour light beams at the output side of the LC panel will be substantially parallel to one another and the angle of spread of each beam will be substantially the same. The microlens elements of this second microlens element array may be of a graded index type which can be formed within a glass substrate conveniently.

Alternatively, the deflecting element array may comprise an array of micro prism elements in which the individual micro-prism elements deflect the light colours in the desired manner. The microprism elements may be of a graded index type formed in a glass substrate of the panel.

Where each group of display elements comprises three adjacent display elements in a row, the first-mentioned microlens element array may comprise spherical microlens elements each covering a group of three display elements or a series of cylindrical microlens elements extending parallel to one another, with each element covering a respective group of three adjacent columns of display elements and with portions of a cylindrical element being associated with respective groups. If the deflecting element array also comprises microlens elements, these elements may consist of either spherical microlens elements or a series of corresponding cylindrical elements.

In a delta illumination layout in which the groups of display elements each comprise three display elements arranged in a delta configuration, the first mentioned microlens element array, and likewise the deflecting element array if this comprises microlens elements, may comprise spherical microlens elements arranged in a rectangular or hexagonal format.

BRIEF DESCRIPTION OF THE DRAWINGS

Embodiments of colour liquid crystal projection display systems in accordance with the invention will now be described, by way of example, with reference to the accompanying drawings, in which.

It should be understood that the Figures are merely schematic and are not drawn to scale. In particular certain dimensions such as thicknesses and spacings may have been exaggerated whilst other dimensions may have been reduced.

DETAILED DESCRIPTION OF PREFERRED EMBODIMENTS OF THE INVENTION

Figure 1:
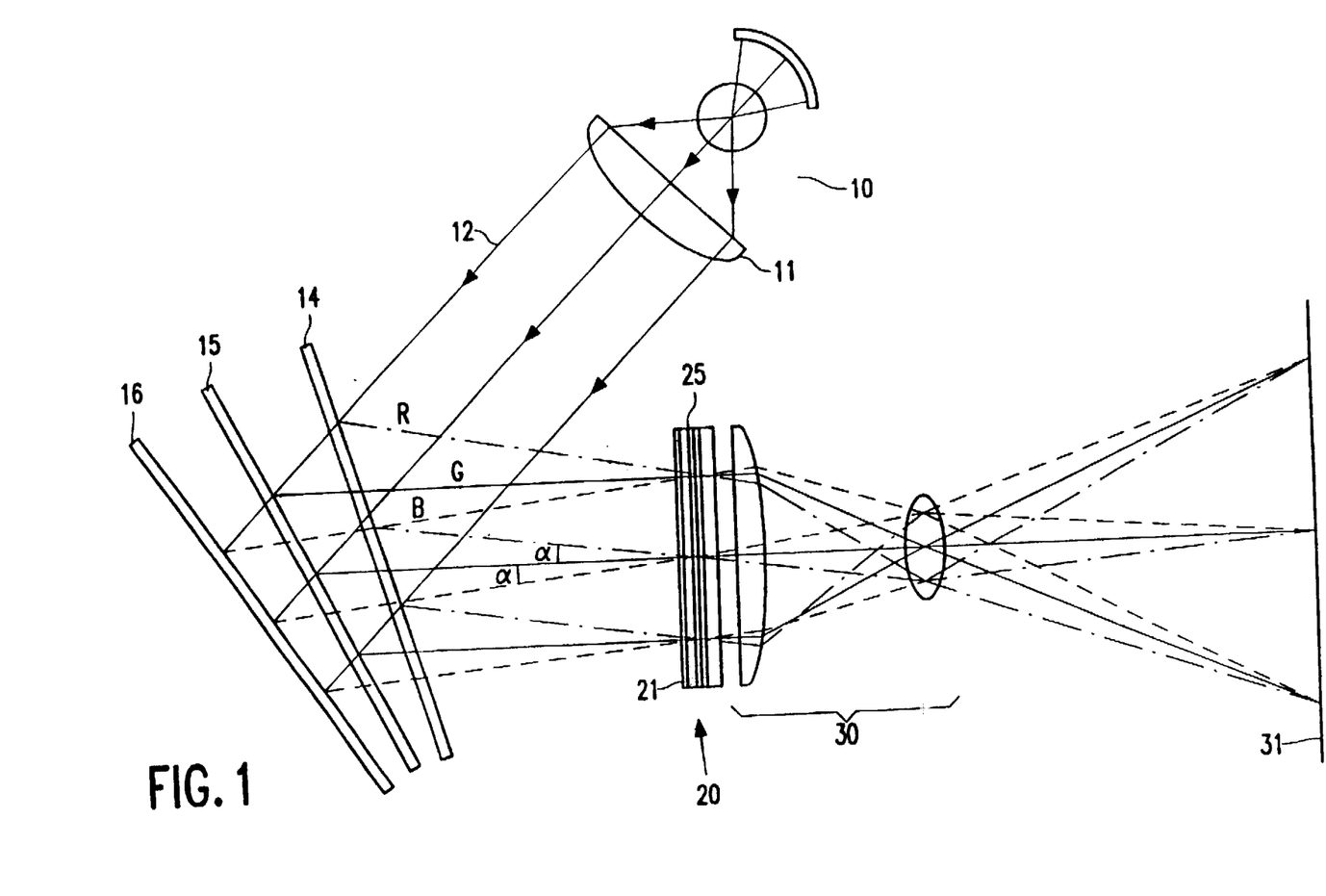
FIG. 1 is a schematic diagram of an embodiment of colour LC projection display system according to the present invention.

Referring to FIG. 1, the projection system, which may be used for TV or datagraphic display purposes, comprises a light source 10, preferably in the form of an arc lamp, which generates white light that is directed, with the aid of a rear reflector, through a condenser lens 11 to form a generally parallel beam 12 of white light. A set of three dichroic mirrors 14, 15, 16, slantingly arranged with respect to the beam 12 at mutually different angles, separates the white light into red, R, green, G, and blue, B, component beams. Red light, represented by dashed lines, is reflected from the input surface the first mirror 14. Of the transmitted blue and green light, the green light, represented by solid lines, is reflected from the input surface of the second mirror 15 back through the mirror 14. The transmitted blue light, represented by the dotted lines, is reflected by the mirror 16 back through both the mirrors 15 and 14. The three differently coloured, R, G and B light beams are directed onto an active matrix LC display panel 20 having a microlens element array 21 at its input side. The light source, dichroic mirrors and LC panel are arranged relative to one another such that the three differently coloured, R, G and B, illuminating beams, each of generally parallel light, are incident on the LC panel 20 from mutually different directions. In the example embodiment of FIG. 1 then the green beam is shown for simplicity as arriving substantially perpendicularly to the plane of the panel 20 and the blue and red beams are shown as arriving at an angle, designated a in FIG. 1, to either side of the perpendicular.

The LC panel 20 has a row and column array of individually drivable LC display elements of conventional form each of which is controlled via a respective switch device comprising a TFT or a two terminal, non-linear device such as a thin film diode. The microlens element array 21 consists of a set of microlens elements, each of which is aligned with, and overlies, a respective group of three adjacent display elements, for focusing light from the red, green and blue illuminating input beams through respective sets of the display elements, where the light is then modulated according to an applied video signal.

The projection system as described thus far is similar in many respects to that described in EP-A-0465171 to which reference is invited for further description of the general construction and operating principles of the light source 10, the set of dichroic mirrors 14, 15 and 16, and the LC display panel 20 and its microlens array 21, and whose disclosure in these respects is incorporated herein by reference.

In operation, the microlens elements of the array 21 each focus light of the three differently coloured, and differently directed, illuminating beams into three separate images, each of which is coincident with a respective display element of its associated group. The display elements of the panel 20 are driven via their associated switch devices to modulate their respective light inputs in conventional fashion by a drive circuit (not shown) that selects the rows of display elements of the array in turn and drives the display elements in a selected row according to the video information in a supplied video signal, this operation being repeated for successive fields of the video signal to produce successive display output fields. The display light output from the panel 20, comprising the individual modulated light outputs from the display elements, is collected by a single projection lens 30 and projected onto a screen 31 where a full colour projected image is displayed.

The manner in which the R, G and B component beams are guided through the LC panel 20 differs from that of the system of EP-A0465171. This difference results in the light emerging from the panel 20 having a smaller spread which has the advantage, inter alia, of allowing a projection lens of smaller angular aperture to be used.

In the system of EP-A-0465171, light emerging from the panel has a much larger spread than the spread of the input light. The microlens elements of the array each serve to converge the light of each of the three illuminating beams arriving at mutually different angles, ignoring for simplicity any divergence of the input light due to, for example, the finite size of the arc of the light source, and focus this light onto respective ones of the associated group of three adjacent display elements. After passing through a focus at each display element the light emerges as a diverging beam. In the case, for example, in which one of the three illuminating beams is directed along a central axis perpendicularly to the panel and the other two, side, beams are directed onto the panel at equal but opposite angles α with respect to that central axis, the light emerging from the centre display element of a group associated with a microlens element then consists of a divergent beam whose centre line is substantially parallel to the central axis whereas light emerging from the two outer display elements of the group consist of diverging side beams whose centre lines are tilted to either side of the central axis by the angle α. For the display panel output as a whole, the three differently coloured and modulated output light beams emerging from the panel as a result of illumination by the three illuminating beams in combination constitute an output beam having a much larger spread than the input light.

In the system of FIG. 1, the panel 20 further includes an array of optical deflecting elements 25 which, with regard to a typical group of three adjacent display elements associated with a microlens element of the array 21, adjusts the directions of at least two of the light colours obtained from two display elements to of the group to bring the directions of the three colours of light from a group at the output side of the panel towards a common direction, and preferably parallel to one another. In bringing the directions of the centre lines of the three colour light beams outputted from the panel closer together and preferably substantially parallel with one another, the amount of spread of the light emerging from the panel, is, of course, considerably reduced.

Figure 2:
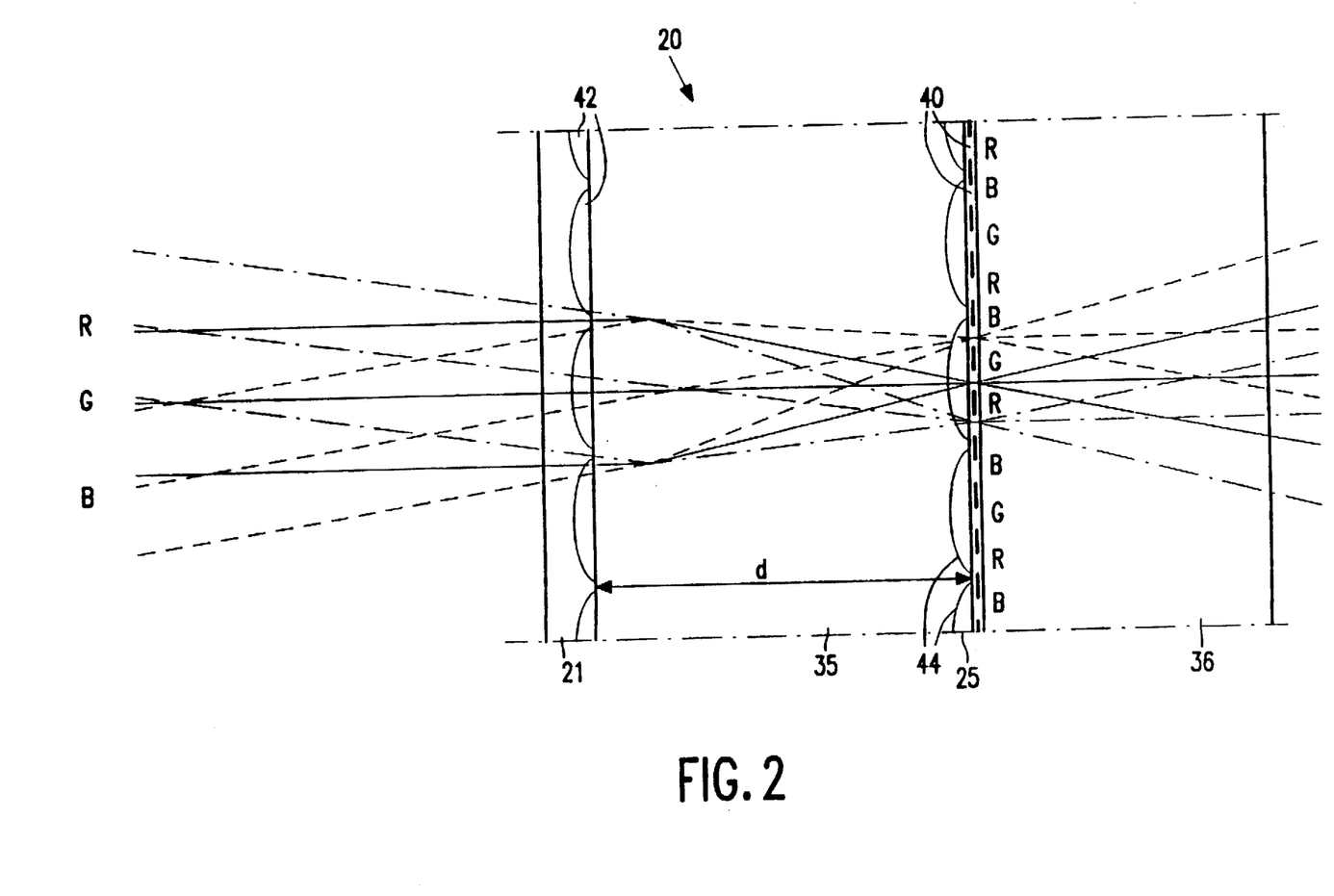
FIG. 2 is an enlarged schematic cross-sectional view through an LC panel in one embodiment of the system of FIG. 1 showing example light paths in operation.

FIG. 2, which shows schematically a cross-section through a typical part of the LC panel 20 in one embodiment of the system and example light paths therethrough, illustrates the operation and effect of the deflecting element array 25. The panel 20 comprises two spaced glass substrates 35 and 36 with twisted nematic LC material disposed therebetween. The substrates carry address lines and electrodes (not shown) in conventional fashion defining a row and column array of display elements, some of which elements from one row are shown here as simple blocks 40 with the letter R, G or B denoting their associated colour. The microlens array 21 carried on the outer surface of the substrate 35 consists of microlens elements 42 each of which is aligned with a respective group of three adjacent display elements 40 in the row and directly overlies that group, the width of the microlens element corresponding approximately with the width of the group. In this embodiment, the microlens element array can comprise spherical geometry lenses overlying respective groups of display elements or a series of parallel, cylindrical geometry elements extending column-wise of the panel, each element covering three adjacent columns of display elements. Green light of the central illuminating beam arriving at a microlens element 42 substantially perpendicularly to the plane of the substrate 35 is directed onto the central, G, display element 40 of its underlying group and red and blue light of the two side beams arriving at that microlens element is directed respectively onto the display elements immediately to either side of the green, central, display element, as depicted by the ray paths in FIG. 2. The power of the microlens element 42 is selected so as to converge and focus the three colours of light into three separate images in the plane of the display element array, this plane being spaced from the microlens array by the thickness, d, of the substrate 35. As can be seen from FIG. 2, the centre lines of the two side beams (R, B) in the substrate 35 are tilted with respect to the centre line of the central beam (G) and at a region close to, and including, the plane of the display element array become separate and do not overlap one another.

The optical deflecting element array 25 is arranged so as to redirect the side beams which emerge from the two outer display elements of each group and bring the directions of these side beams more into line with the directional axis of the central beam. To achieve this desired bending, the deflecting element array 25 is positioned close to the plane of the display element in the region where the central and side beams do not overlap. In this embodiment, the deflecting element array 25 comprises a further microlens element array formed in the glass of the substrate 35 immediately adjacent its inner surface as graded index microlens elements and of similar configuration to the array 21. Each microlens elements 44 of the array corresponds to, and is aligned with, a respective microlens element 42 of the array 21 and overlies the three display elements 40 of the group associated with that element 42.

Each microlens element 44 allows light of the central, G, beam arriving at its centre to pass through without any significant change to its directional axis. The two, R, B, side beams which arrive towards the opposing edges of the microlens element 44 are deflected in equal but opposite directions such that the directions of their centre lines at the output side of the display elements are brought substantially into line with the direction of the centre line the central G beam, as shown in FIG. 2. The focal length of the microlens elements 44, taking into consideration the refractive index of the substrate 35, is selected to be approximately equal to the distance, d, from the microlens element array 21 so that the three different colours pass through and, emerge from the display elements with substantially the same range of angles as also shown in FIG. 2.

The technology of graded index type microlens element arrays is well established and it is not thought necessary to describe their fabrication here in detail. Example fabrication techniques are referred to in EP-A-0465171. The formation of graded index type microlens elements 44 in the substrate 35 requires that the glass used for the substrate be of the appropriate type which allows ion exchange. The substrate 35 is preferably the passive plate of the panel, that is ,the substrate which does not carry the switch devices of the display elements, as this substrate requires less processing during manufacture. Preferably, because of the reactive nature of the material required for the substrate 35, the surface of this substrate is covered by a thin, transparent protection layer prior to the electrode structure being deposited thereon.

The positioning of the optical deflector element array 25 adjacent to the input side of the display element array so that the side beams are bent before they enter their respective display elements has a secondary advantage of more uniform performance as the angles of light through the LC material, which are instrumental in determining transmission values, are then substantially the same for all colours.

Figure 2A:
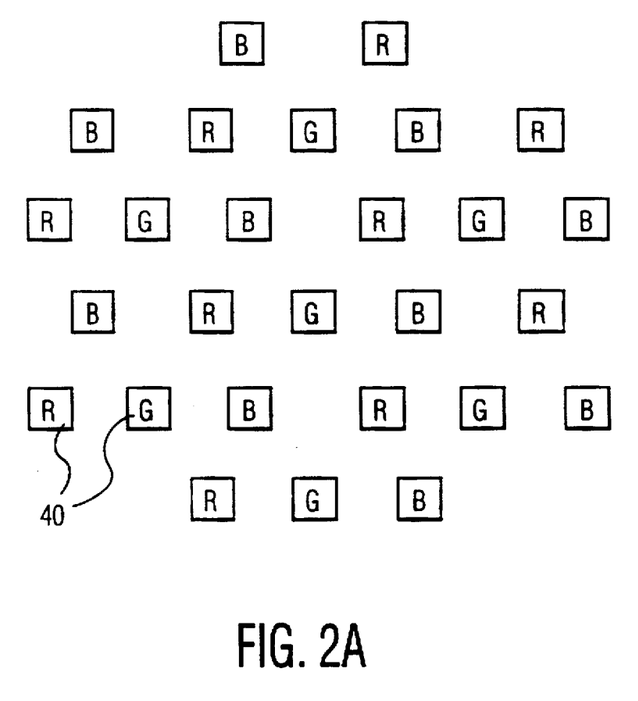
FIG. 2(a) is a plan view of a display element array.

Various forms of microlens element are possible for both of the arrays 21 and 25. If of cylindrical form, the microlens elements 42 and 44 are arranged in parallel strips. If of spherical, or toroidal, form, the elements 42 and 44 may be arranged in a hexagonal or square format and adjacent rows may be staggered with respect to each other if desired. If a delta colour illumination element layout is employed, as discussed in EP-A-0 465 171, in which red, green and blue display elements 40 are grouped in a delta configuration as illustrated in FIG. 2a, spherical or toroidal, microlens elements are required.

The optical deflecting element array 25 may comprise elements other than microlens elements which are suitable for the purpose of achieving the desired deflection. In an alternative embodiment, a system of microprisms may be formed in the substrate 35 in close proximity to the plane of the display elements 40 to perform a similar function to the microlens elements 44 in bending the side beams in the required manner.

Figure 3A:
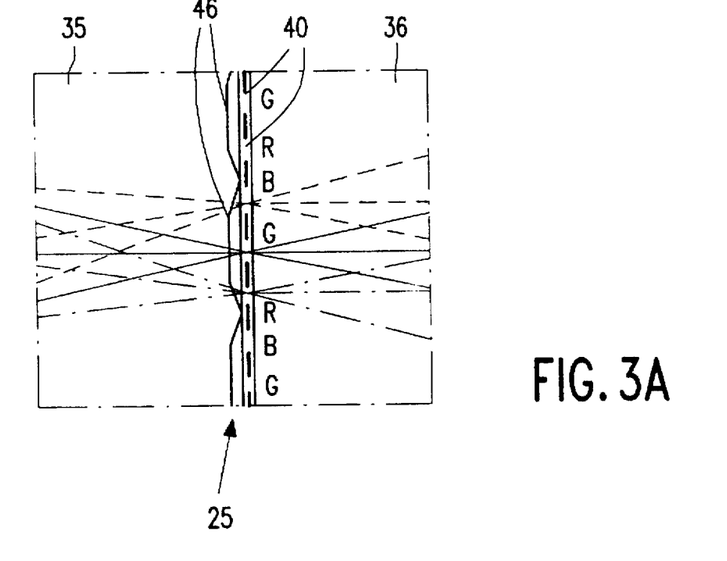
FIGS. 3A and 3B are schematic cross-sectional views through a part of the LC panel in alternative forms of a second embodiment of the system of FIG. 1.
Figure 3B:
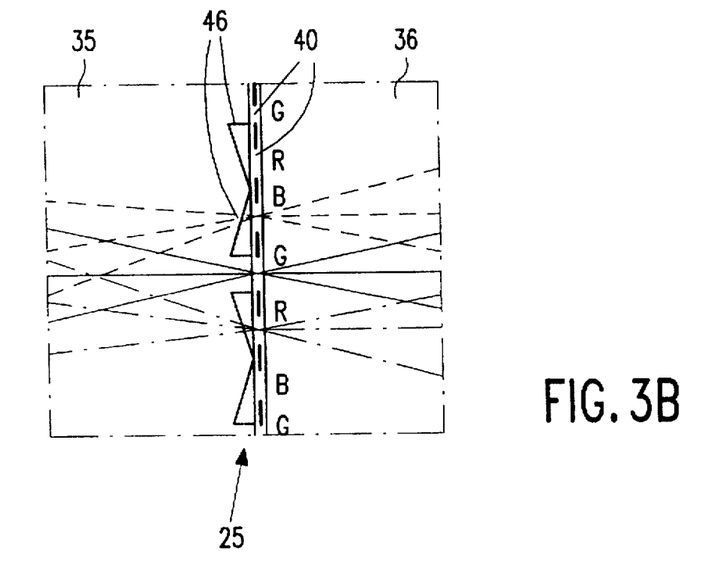

FIGS. 3A and 3B illustrate schematically two alternative forms of such microprism elements, referenced at 46, associated with the groups of display elements. As is seen from these figures, the central G beam is allowed to pass through the associated display element of each group without suffering any deflection, while the directions of the two, R and B, side beams are deflected by microprism elements in a general similar manner to that obtained by the previously described microlens elements. In the embodiment of FIG. 3A, the structure of the microprism elements overlies completely the groups of display elements, while in the embodiment of FIG. 3B the structure of the microprism elements involves only the two outer display elements of said group. Both forms comprise slanting, flat-surfaced prisms overlying the outer display elements of each group. The microprism element array can be formed in the substrate 35 using graded index technology or by suitably sculpturing the surface of the glass substrate 35 to form recesses defining the microprism element interface surfaces and then filling the recesses with optically transparent material leaving a flat, outer, surface.

Various modifications are possible. For example, the deflecting element array 25 may instead be positioned in close proximity to the plane of the display element array adjacent to the output side of the display elements by forming the array at the inner surface region of the substrate 36 rather than in the substrate 35, although the advantages of equalising the angles of light through the display elements would then be lost. Instead of being incorporated in a glass substrate, the deflecting element array could be provided on the inner surface of a glass substrate as a separate component to the substrate.

In the above-described embodiments, the illumination of the panel 20 has been described for simplicity with reference to a central, G, illuminating beam directed substantially perpendicularly to the panel and two side beams, R and B, directed at an angle to the central beam. However, it will be understood that other illuminating arrangements, using three different -colour beams incident on the panel from mutually different directions, can be employed. Thus, the central illuminating beam may be directed onto the panel at an angle away from the perpendicular and the direction of the two side beams adjusted accordingly. This may be achieved simply by tilting the illuminating beams slightly with respect to the panel 20. By suitably selecting the angle at which the central beam is directed onto the panel and positioning the deflecting element array such that the light of the side beams is deflected before entering the display elements, it can be arranged that all three colours of light pass through their respective display elements at an angle which provides optimised contrast, this angle being similar, but not necessarily identical, for all display elements. With such tilting, it will be appreciated that the microlens element of the array 21 and their respective associated deflecting elements of the array 25 need not directly overlie one another but could be offset with respect to one another, and to the associated group of display elements.

In the embodiments described above with reference to FIGS. 2, 3A and 3B, each group of display elements comprises three adjacent display elements in a line. However, for a delta colour illumination layout in which each group comprises display elements from two adjacent rows, as mentioned in EP-A-0 455 171, requiring spherical microlenses for the array 21, the directions of the three illuminating beams are selected accordingly and in this case there is not, as such, a central illuminating beam. If used the microprism elements of the array 25 would then each comprise three flat surfaces arranged in pyramidal form.

Further although the above described embodiments use an active matrix LC display panel, it will, of course, be appreciated that the panel could instead be a simple passive, multiplexed matrix, display panel. Also, means for generating and directing the three illuminating beams on to the LC panel at mutually different angles other than the described arrangement may be employed, as discussed in EP-A-0465171. For example, three separate, red, green and blue, light sources could be used.

From reading the present disclosure, other modifications will be apparent to persons skilled in the art. Such modifications may involve other features which are already known in the field of colour liquid crystal projection display systems and which may be used instead of or in addition to features already described herein.

We claim:

1. A colour liquid crystal projection display system comprising a liquid crystal panel having a planar array of display elements for modulating light to produce a display output, a projection lens for collecting the display output from the panel and projecting the display output onto a screen, illuminating means for directing three differently-coloured light illuminating beams onto the panel such that they are incident on the panel from mutually different directions, in which the panel is provided with an array of microlens elements at its input side via which the three different colours of input light are directed onto respective sets of the display elements in the array, and in which each microlens element of the array is associated with a group of three adjacent display elements and input light of one colour is directed through the microlens element towards one display element of its associated group and input light of the other two colours is directed through the microlens element at different angles respectively towards the other two display elements of the group, characterised in that the panel includes an array of optical deflecting elements spaced from the microlens element array close to the plane of the display elements which deflecting elements deflect the directions of light of at least two of the three colours from each microlens element to bring the respective directions of light of the three colours from the associated group of display elements at the output side of the panel towards a common direction.

2. A colour liquid crystal projection display system according to claim 1, characterised in that the array of deflecting elements is disposed between the display element array and the microlens element array.

3. A colour liquid crystal projection display system according to claim 1, characterised in that the deflecting element array is arranged to deflect the directions of light of at least two of the three colours from each microlens element such that the directions of light of the three colours at the output side of the panel are substantially parallel to one another.

4. A colour liquid crystal projection system according to claim 1, characterised in that each group of display elements comprises three adjacent display elements in a row and in that light of the two colours associated respectively with the display elements to either side of the central display element in a group are deflected by the deflecting element array such that they are directed along respective axes substantially parallel to the directional axis of light of the colour associated with the central display element.

5. A colour liquid crystal projection display system according claims 1 characterised in that each group of display elements comprises three adjacent display elements arranged in a delta configuration and in that the light of the three colours from each microlens element are each deflected by the deflecting element array such that they are directed along substantially parallel axes.

6. A colour liquid crystal projection display system according to claim 1, characterised in that the deflecting element array comprises a second microlens element array and in which each microlens element corresponds to, and is aligned with, a respective microlens element of the first-mentioned microlens element array and covers the group of three display elements associated with the microlens element of the first-mentioned array.

7. A colour liquid crystal projection display system according to claim 6, characterised in that the focal length of each microlens element in the second array is substantially equal to the optical distance between the second array and the first-mentioned microlens element array.

8. A colour liquid crystal projection display system according to claim 1 characterised in that the optical element array comprises an array of microprism elements.

9. A colour liquid crystal projection display system according to claim 1, characterised in that the deflecting element array is incorporated in a glass substrate of the liquid crystal panel.

10. A colour liquid crystal projection display system according to claims 1, characterised in that the deflecting element array is provided on the inner surface of a glass substrate of the liquid crystal panel.

11. A colour liquid crystal projection display system according to claim 2, characterised in that the deflecting element array is arranged to deflect the directions of light of at least two of the three colours from each microlens element such that the directions of light of the three colours at the output side of the panel are substantially parallel to one another.

12. A colour liquid crystal projection system according to claim 2, characterised in that each group of display elements comprises three adjacent display elements in a row and in that light of the two colours associated respectively with the display elements to either side of the central display element in a group are deflected by the deflecting element array such that they are directed along respective axes substantially parallel to the directional axis of light of the colour associated with the central display element.

13. A colour liquid crystal projection system according to claim 3, characterised in that each group of display elements comprises three adjacent display elements in a row and in that light of the two colours associated respectively with the display elements to either side of the central display element in a group are deflected by the deflecting element array such that they are directed along respective axes substantially parallel to the directional axis of light of the colour associated with the central display element.

14. A colour liquid crystal projection display system according to claim 2, characterised in that each group of display elements comprises three adjacent display elements arranged in a delta configuration and in that the light of the three colours from each microlens element are each deflected by the deflecting element array such that they are directed along substantially parallel axes.

15. A colour liquid crystal projection display system according to claim 3, characterised in that each group of display elements comprises three adjacent display elements arranged in a delta configuration and in that the light of the three colours from each microlens element are each deflected by the deflecting element array such that they are directed along substantially parallel axes.

16. A colour liquid crystal projection display system according to claim 2, characterised in that the deflecting element array comprises a second microlens element array in which each microlens element corresponds to, and is aligned with, a respective microlens element of the first-mentioned microlens element array and covers the group of three display elements associated with the microlens element of the first-mentioned array.

17. A colour liquid crystal projection display system according to claim 5, characterised in that the deflecting element array comprises a second microlens element array in which each microlens element corresponds to, and is aligned with, a respective microlens element of the first-mentioned microlens element array and covers the group of three display elements associated with the microlens element of the first-mentioned array.

18. A colour liquid crystal projection display system according to claim 17, characterised in that the focal length of each microlens element in the second array is substantially equal to the optical distance between the second array and the first-mentioned microlens element array.

19. A colour liquid crystal projection display system according to claim 2, characterised in that the optical element array comprises an array of microprism elements.

20. A colour liquid crystal projection display system according to claim 19, characterised in that the deflecting element array is provided on the inner surface of a glass substrate of the liquid crystal panel.

* * * * *